Dec. 8, 1959 V. H. PAVLECKA 2,916,332
AEROSTATIC BEARINGS WITH FLUID-DYNAMIC SEALS
Filed Sept. 8, 1958 4 Sheets-Sheet 1

INVENTOR.
VLADIMIR H. PAVLECKA
BY
Nicholas T. Volk
ATTORNEY.

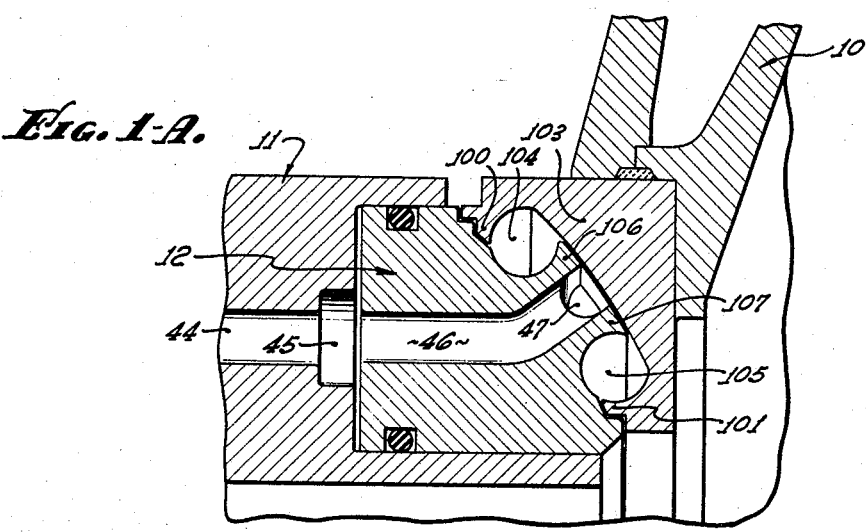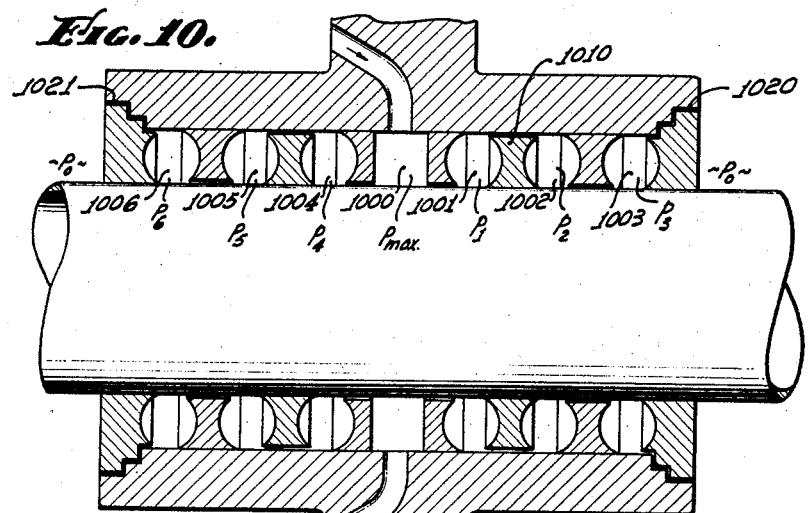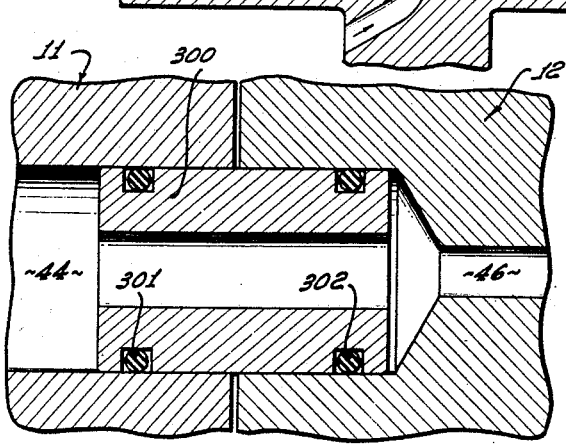

Dec. 8, 1959 V. H. PAVLECKA 2,916,332
AEROSTATIC BEARINGS WITH FLUID-DYNAMIC SEALS
Filed Sept. 8, 1958 4 Sheets-Sheet 3

INVENTOR.
VLADIMIR H. PAVLECKA
BY
Nicholas T. Vohr
ATTORNEY.

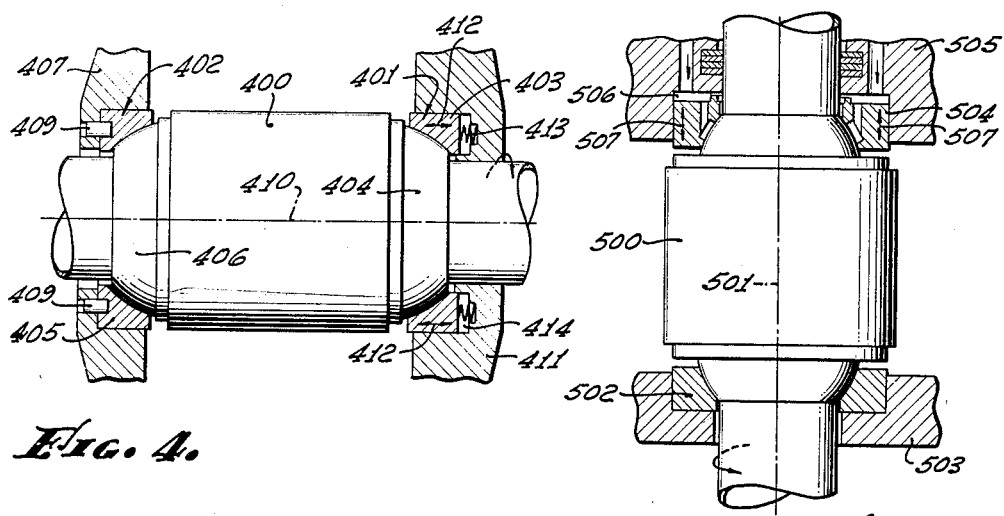
Fig. 4.
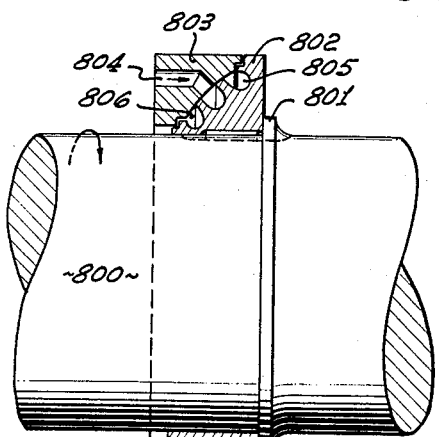
Fig. 5.
Fig. 8.
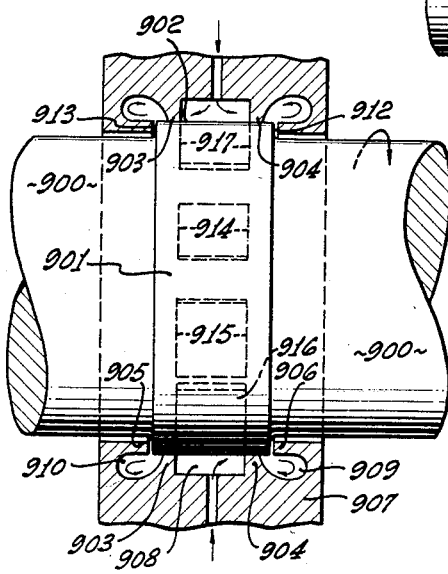
Fig. 9.
INVENTOR.
VLADIMIR H. PAVLECKA United States Patent Office 2,916,332
Patented Dec. 8, 1959

2,916,332
AEROSTATIC BEARINGS WITH FLUID-DYNAMIC SEALS

Vladimir H. Pavlecka, Pacific Palisades, Calif.

Application September 8, 1958, Serial No. 759,626

7 Claims. (Cl. 308—9)

This invention relates to aerostatic bearings provided with gas seals for reducing the leakage of gas used for operating the bearings.

In recent years, there has been an increased interest in aerodynamic and aerostatic bearings which have much less friction than hydrodynamic and anti-friction bearings, and which can operate at very high peripheral speeds. Aerostatic and aerodynamic bearings both require a supply of working fluid for their operation. Such working fluid is generally compressed air, although it is feasible to use other gases and such fluids as mineral or vegetable oils, even though lack of compressibility in oils will make them less desirable fluids, as compared to air or inert gases. The term "fluid," as used in this specification, therefore, shall include gases as well as liquids.

The difference between the aerostatic and aerodynamic bearings resides in the fact that while in aerodynamic bearings the load is supported by the dynamic, or moving, film of fluid, in aerostatic bearings, the working fluid is used as a fluid mass under pressure for supporting the load. Accordingly, from the classical concept of the aerostatic bearing, there need not be any dynamic flow of fluid for its operation, and if the above ideal were attainable, then there would be no flow of fluid except for the internal eddy currents that would be induced by the moving surface which is supported by the fluid. However, such ideal is not attainable in practice because, in order to prevent any leakage of fluid, it would be necessary to have direct metallic contact between the rotatable member and the stationary member which would at once impair the frictionless features of the bearing, and, at high speeds, would make it inoperative. Accordingly, a small gap of the order of .001 of an inch ordinarily exists between the moving and the stationary members, with the result that there is a small leakage of the working fluid through such gap. If such leakage is relatively large, the losses encountered with the aerostatic bearings become quite large, larger than those obtainable with the hydrostatic bearings, and under such conditions, it becomes more advantageous to use hydrostatic bearings, at least at low speeds and with heavy loads. However, if it were only possible to reduce the leakage in the aerostatic bearings, even at low speeds and with heavy loads, then their range could be extended to lower speeds and higher loads and their efficiency would be comparable with the efficiency of the hydrostatic bearings.

The invention discloses aerostatic bearings in which the gap leakage is reduced by interposing one or several labyrinth fluid traps, each trap resembling, or approaching, in its geometry, a hollow toroid which is used as a pressure reducer and also as a leakage trap. The toroid acts as a pressure reducer because of the drop in pressure which takes place between the main, centrally located cavity of the bearing and the laterally positioned, or adjacent, toroidal cavities, the cavities being separated from each other by a lateral wall forming a very small clearance, of the order of .001 of an inch, with the rotor of the bearing. The lateral wall, or walls, and small air gap, or clearance, between adjacent, opposed surfaces of the walls and the stator or the rotor surface, offer high resistance, or impedance, to the leakage of fluid with the resulting reduction in pressure in the succeeding toroidal cavities. The toroidal cavities produce a vortex in the fluid escaping into it from the main cavity, and this vortex acts as a dynamic fluid seal with respect to the fluid leaving the toroidal cavity through the second gap that separates the rotor and the stator of the bearing.

It is, therefore, one of the objects of this invention to provide a novel configuration for the aerostatic bearings of the above type which also include dynamic fluid seals within their configuration for reducing the amount of leakage of the working fluid through such bearings.

An additional object of this invention is to provide aerostatic bearings having low fluid leakage, this low leakage being obtained by interposing one or more toroidal cavities between the main, or central, cavity of the bearing and ambient air.

It is still another object of this invention to provide aerostatic bearings with dynamic fluid seals, the fluid seals being obtained by means of toroidally-shaped cavities which, in part, are located in the rotor of the bearing and, in part, in the stator of the bearing with the air gap being positioned within said toroidal cavity so that the fluid vortexes produced in the cavities act as dynamic fluid seals for opposing and thus reducing the leakage of fluid through the fluid gaps of the bearings.

The novel features which are believed to be characteristic of this invention, both as to its construction and method of operation, together with further objects and advantages thereof, will be better understood from the following description given in connection with the accompanying drawings in which several embodiments of the invention are illustrated by way of several examples. It is to be understood, however, that the drawings are for the purpose of illustration only and are not intended as a definition of the limits of the invention.

Referring to the drawings:

Fig. 1 is an axial longitudinal sectional view of the upper half of one version of an air bearing, Fig. 1-A is a modified version of Fig. 1, Fig. 2 is a perspective view of a segment of the stator of the bearing illustrated in Fig. 1, Fig. 3 is a transverse sectional view of the air bearing illustrated in Figs. 1 and 2, taken along line 3—3 illustrated in Fig. 1, Fig. 3-A is a sectional view of a leakproof connection, Fig. 4 is a side view, partly in section, of the entire rotor of the machine supported by two air bearings, with the rotor of the machine having a horizontal axis of rotation, Fig. 5 is an identical view to that of Fig. 4 but for the rotor having a vertical axis of rotation, Fig. 6 is an axial longitudinal sectional view of the upper half of an air bearing similar to that illustrated in Figs. 1 through 3, but with the geometries of the respective rotors and stators reversed.

Fig. 8 is an axial longitudinal sectional view of the air bearing adapted for supporting either a horizontal shaft or a vertical shaft, Fig. 9 is a side view, partly in section, of an air bearing suitable for supporting a horizontal rotatable shaft, and Fig. 10 is an axial sectional view of another version of an air bearing having a plurality of toroidal sidechambers or cavities.

Figures 1, 2:
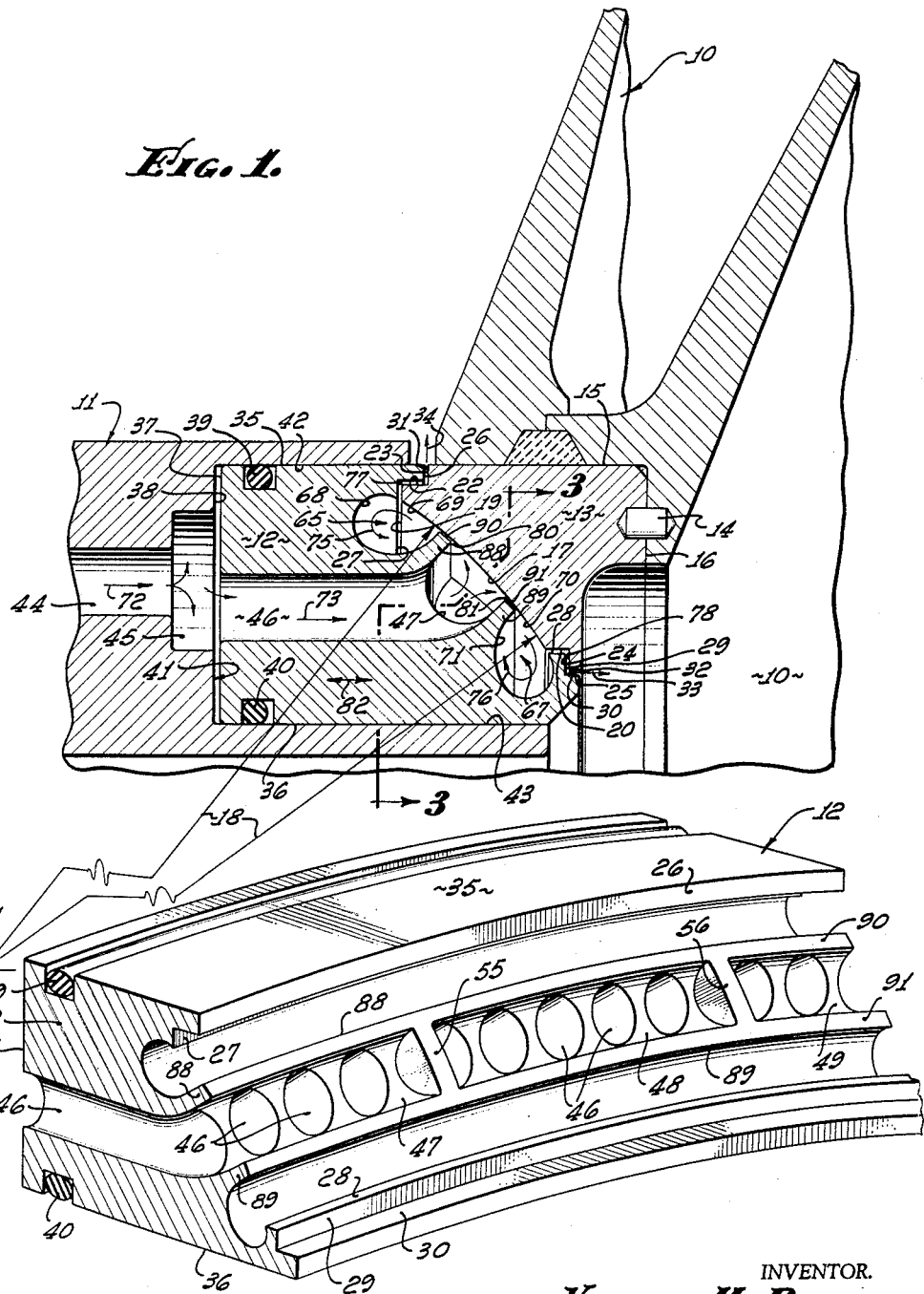
Figure 3:
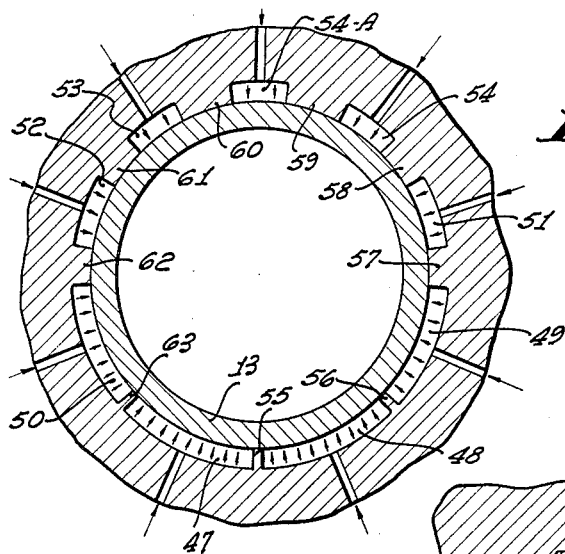

Referring to Figs. 1 through 3, a disc-shaped rotatable member of the machine is illustrated at 10, while the stationary frame is illustrated at 11. The air bearing includes a stator 12 and a rotor 13. Rotor 13 is mounted in a suitable cavity provided in the disc-shaped member, or rotor, 10 and is attached to rotor 10 by means of a plurality of pins 14 which are uniformly distributed around the periphery of the rotors 10 and 13. In the illustrated example, the cross-sectional view of the ring-shaped rotor 13 resembles a triangle having straight sides 15 and 16 and a circular, concave third side 17 having a radius 18. The center of this radius is located on the axis of rotation 21 of rotor 10. The concave surface 17 meets at both ends two surfaces 19 and 20, surface 19 lying in a transverse plane perpendicular to the axis of rotation 21 while surface 20 is a cylindrical surface which is concentric with the axis of rotation 21. Surface 19 then meets cylindrical surface 22 and the latter meets a vertical surface 23, the two surfaces 22 and 23 being at right angles to each other. Surface 20 forms right angles with surface 24, and surface 24 forms a right angle with surface 25. Surface 23 of the rotor has the opposed parallel surface 26 on the stator, stator surface 19 has a parallel opposed surface 27, surface 20 has the opposed surface 28, surface 24 has the opposed parallel surface 29 and surface 25 has the opposed parallel surface 30 on the stator, one set of these surfaces defining, in part, the shape of rotor 13, while the other set of opposed surfaces defines, in part, the shape of stator 12. The above opposed surfaces produce two, right angle, labyrinth, zig-zag gaps 31 and 32 which are used for increasing the resistance, or impedance, to the flow of fluid used for operating the bearing. This flow is illustrated by arrows 33 and 34 which indicate the direction of flow of the fluid escaping into ambient surroundings through the bearings and gaps 31 and 32.

The stator of the bearing represents a stationary, continuous ring 12 surrounding axis 21. Ring 12 has two continuous cylindrical surfaces 35 and 36 and a flat, ring-shaped surface 37 which faces a corresponding, opposed flat surface 38 provided in frame 11 of the machine.

Before proceeding with the description of Figs. 1 through 3, it will be helpful to describe Figs. 4 and 5. Fig. 4 illustrates a rotor 400 having an air bearing 401 on one side and an air bearing 402 on the other side. Air bearing 401 has a stator 403 and a rotor 404, and air bearing 402 has a stator 405 and a rotor 406. The left side bearing 402, and its stator 405, is mounted in the stationary frame member 407. Stator 405 makes either a pressed fit with member 407, or it may have a plurality of pins 409 uniformly distributed around the periphery of stator 405 so as to hold it in fixed position within the frame member 407. Accordingly, stator 405 is not capable of sliding in the axial direction, the axis of rotation of rotor 400 being illustrated by line 410. Stator 403, which is the right stator, is mounted in a frame member 411 and this stator forms an axially sliding engagement with the frame member 411 so that it can slide in the axial direction, as illustrated by a two-headed arrow 412. A plurality of coil springs 413 is mounted in a gap 414 which is provided between stator 403 and frame member 411. These springs hold stator 403 in constant engagement with rotor 404. This type of mounting of rotor 400 between the two air bearings 401 and 402 enables the rotor to adjust itself in proper axial relationship with respect to the supporting frame so as to maintain proper air gaps between rotor 400 and the two stators 405 and 403 of the two air bearings. The same type of minute lateral play can be achieved also by merely using the pressure in gap 414 for adjusting the lateral position of stator 403. It is to be noted that the air ducts, such as duct 44 in Fig. 1, are not illustrated in Fig. 4. This type of mounting of the rotor is illustrated in Fig. 5 in connection with a rotor 500 which has a vertical axis of rotation 501. In this case, stator 502 is mounted in a frame member 503, while stator 504 is mounted in the upper frame 505, and it is held in contact with rotor 500 by means of air pressure in a cavity 506. Stator 504 can adjust its vertical position in the manner indicated by an arrow 507.

Resuming again the description of Figs. 1 through 3, stator 12 is also provided with two O-rings 39 and 40 which prevent the escape of compressed fluid introduced into cavity 41 within the frame member 11. This cavity 41 has the shape of a circular cylinder formed by the circular surface 38, a cylindrical surface 42 and a second cylindrical surface 43, the cylindrical surfaces 42 and 43 being concentric with respect to each other and also with respect to the axis of rotation 21. Accordingly, stator 12 may also be considered as a ring-shaped piston which forms either an axially sliding engagement or a fixed engagement with the cylindrical cavity 41 within the frame member 11. The sliding engagement referred to above is along the axis 21 and is illustrated by means of the double-headed arrow 82. It is of the type which has been described already in connection with Figs. 4 and 5 where the sliding is illustrated diagrammatically by the two-headed arrows 412 and 507. The ring-shaped cavity, or cylinder, within the frame member 11 which accommodates stator 12, is connected to a duct 44 through a cavity 45. Cavity 45 is a continuous, ring-shaped cavity when the air bearings are used in the manner illustrated in Fig. 5. In such case, it is possible to have uniform air pressure within the air bearing. In such case, cavity 45 forms a hollow circular ring which is symmetrically located with respect to the axis of rotation 21, extending throughout 360° and, therefore, it is used as a circular duct which supplies compressed air into one or a plurality of air ducts 46 which are distributed around the circumference, or periphery, of stator 12. When the air bearings are used for supporting a horizontal shaft in the manner illustrated in Fig. 4, the pressure exerted by rotor 400 on the lower portion of the bearing corresponds to the weight of the rotor. Therefore, the air pressure in cavity 45 should be higher in the lower portion of the bearings, and lower in the upper portion. When the air bearing is used in the manner illustrated in Fig. 5, cavity 45 is a continuous cavity. The angular dimension of cavity 45 also depends on the type of source of air pressure used for operating the bearings. When a single source is used, cavity 45 may be a continuous cavity. This will become more apparent upon the description of the angular dimensions of the central cavity 47 which is given below. Ducts 46 in stator 12 are best illustrated in Fig. 2, this figure illustrating on an enlarged scale a perspective view of a small segment of stator 12.

Ducts 46, which are approximately centrally located in stator 12, open into a semi-cylindrical central cavity 47 provided with two circumferential cavity walls 88 and 89 whose spherically-shaped convex surfaces 90 and 91, best illustrated in Fig. 2, have a convex spherical surface defined by radius 18. Therefore, the convex surfaces 90 and 91 match the concave surface 17 of the rotor. Cavity 47 is continuous cavity, extending throughout 360°, when the illustrated bearing is used in the manner illustrated in Fig. 5, i.e., the bearing is used either as a thrust bearing 502 or as a centering bearing 504, both of which may have a uniform fluid pressure throughout the 360° of cavity 47. However, when the bearings of the type illustrated in Figs. 1 through 3 are used as axial bearings 401 and 402, illustrated in Fig. 4, then it becomes necessary to have a plurality of cavities 47 through 54A, such as those illustrated in Fig. 3, which are separated from each other by the transverse walls 55 through 63. These transverse walls also have spherical surfaces to match the spherical surface 17 of the rotor. Some of these transverse walls are also illustrated in Fig. 2. It becomes necessary to have a plurality of cavities in this case because the fluid pressure in the upper cavities is lower as compared to the fluid pressure in the lower cavities because the lower cavities must furnish all the aerostatic pressure for supporting the entire weight of the load that must be carried by the bearing. The desired variations in pressure can be obtained in different cavities in a variety of ways, such as for instance, by using different pressure reducers, or impedances, in the pressure lines interconnecting the respective cavities with a single source of pressure. Since systems of this kind are known in the art, they are not illustrated in the drawings. When cavity 45 is not a continuous cavity, the connection between ducts 44 and 46 is of the type illustrated in Fig. 3-A. A sleeve 300 having two O-rings 301 and 302 interconnects the two ducts to prevent the leakage of compressed air from a high pressure cavity to an adjacent low pressure cavity. Stator 12 is also provided with two additional cavities 65 and 67 which are formed by the respective surfaces 68, 69, 70 and 71. Surfaces 68 and 71 are located on stator 12, while surfaces 69 and 70 are located on rotor 13. These two cavities are the previously mentioned toroidal cavities which induce vortex flows indicated by the arrows 75 and 76. The vortex flows act as fluid-dynamic seals opposing the escape of air through the labyrinth gaps 31 and 32.

The operation of the bearing illustrated in Figs. 1 through 3 is as follows: fluid under pressure enters duct 44 in the manner illustrated by an arrow 72. It then enters a circular duct 45 whereupon it distributes itself throughout the circumference of duct 45, if duct 45 is a continuous duct; from duct 45 it enters ducts 46, as indicated by an arrow 73, and cavities 47 where it exerts static pressure on rotor 13. When the air bearing is used in the manner illustrated in Fig. 4, this pressure should be high enough to lift rotor 13 from stator 12 when this pressure is combined together with the reduced static pressure of the fluid found in cavities 65 and 67. Therefore, the total lift exerted on the rotor 13 by the fluid under pressure is that obtained with the aid of cavities 47, 65 and 67. Since the air gap that exists between the concave, spherical surface 17 and the surfaces 90 and 91 of the order of .001 of an inch, these gaps furnish high impedance, or resistance, to the flow of fluid from cavity 47 to the cavities 65 and 67 through the respective air gaps and, therefore, the pressure of the fluid in the cavities 65 and 67 is considerably lower than that found in cavity 47. The direction of flow of the fluid in cavities 65 and 67 is illustrated by the arrows 75 and 76 which indicate that the fluid in these two cavities forms a vortex in each cavity because of the approximately toroidal shape of these cavities. It is possible to make these cavities substantially perfect hollow toroids to increase the velocity of the fluid in each vortex.

Examination of the direction of the flow of the fluid within the toroids 65 and 67, illustrated by the arrows 75 and 76, indicates that this flow will act as a dynamic gas seal against the escape of the fluid from the toroidal chambers 65 and 67 through the labyrinth seals 77 and 78. This latter flow is illustrated by the arrows 33 and 34. This fluid seal is formed by the fluid which moves at relatively high speed across the gap existing between the opposed surfaces 20 and 28, and 19 and 27 on the respective parts of the rotor and stator of the bearing. The fluid seal is a function of the kinetic energy or the velocity of the fluid adjacent to the gap and such dynamic sealing of the gap is an effective sealing against leakage through the gap.

Accordingly, the leakage of the fluid through the bearing is reduced by first providing two small gaps 80 and 81 between the main chamber and the toroids, and by producing a vortex flow in the toroids. Gaps 80 and 81 also act as two aerodynamic bearings during the operation of the bearings. Surfaces 90, 91, 17, 20, 28, 25 and 30 must be proportioned and made so as to enable the bearings to function as dry bearings when the bearing does not have any air supply or low pressure air supply at the time the rotation is started, and discontinued, i.e., during acceleration and deceleration periods. The above surfaces then must be "electrolized" according to the known methods used in the United States, or provided with the "glacier" surfaces developed in England and used in England and the United States, which make them suitable for periodic dry running. When separate air supply is provided for starting, or starting and running, then special treatment of the above surfaces becomes unnecessary.

Fig. 1–A illustrates a modification of the bearing illustrated in Fig. 1. The difference between Fig. 1 and Fig. 1–A resides in the extensions 100 and 101 which are provided in rotor 103. Toroidally shaped cavities 104 and 105 are made to approach circular sections more closely for increasing the vortex velocities within the cavities. The rotor extensions 100 and 101 function in the same manner as the stator extensions 106 and 107 which correspond to the stator extensions 88 and 89 in Fig. 1. This version of the bearing is shown in Fig. 1–A to illustrate that the extensions 106, 107, 100 and 101 can be provided on the rotor as well as on the stator in an alternating manner, as illustrated in Fig. 10, and that the bearings of this type may have a plurality of toroidal cavities on each side of the central cavity 47. Fig. 10 will be described at the end of this specification.

Figure 6:
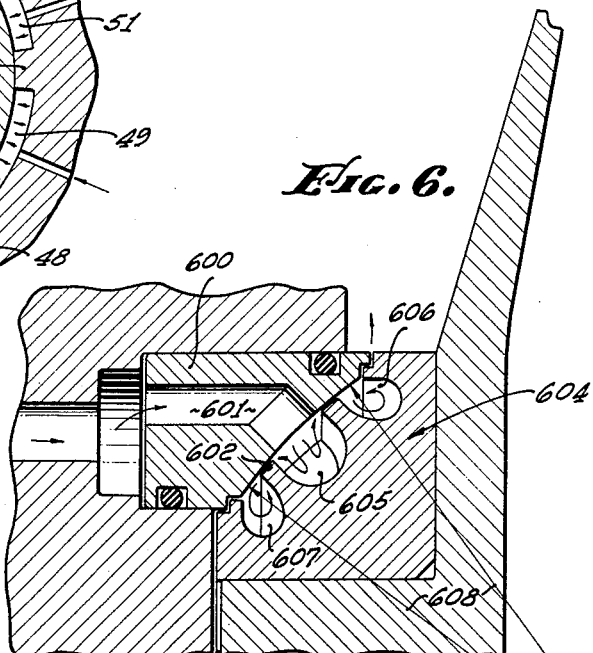

Fig. 6 illustrates an axial cross-sectional view of the stator and rotor in which the position of these two members is reversed as compared to that shown in Fig. 1. Accordingly, no detailed description of Fig. 6 is necessary. It merely illustrates the fact that stator 600 may be constructed so as to include duct 601, which corresponds to duct 46 in Fig. 1, and a spherical concave surface 602, which corresponds to the spherical concave surface 17 in Fig. 1. Accordingly, there is a direct reversal of components in Figs. 1 and 6. As to the rotor 604 in Fig. 6, it includes the central cavity 605 and the toroidal cavities 606 and 607 which perform the same function as the toroidal cavities 65 and 67 in Fig. 1. The concave spherical surface 602 has a radius 608 whose center 609 is positioned on the axis of rotation 610 of the entire machine and of the rotor 604 of the machine's bearing. The functioning of the bearing illustrated in Fig. 6 is similar to the functioning of the bearing illustrated in Fig. 1 and, therefore, requires no additional description.

Figure 7:
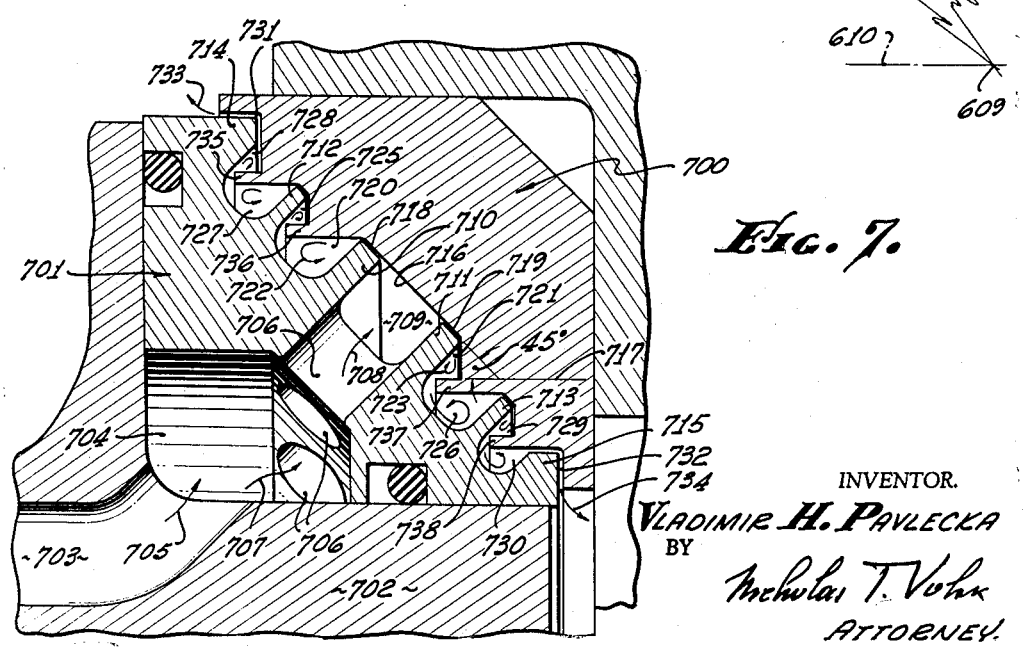
Fig. 7 is an axial longitudinal sectional view of the upper half of an air bearing similar to that illustrated in Figs. 1 through 4, but having one main aerostatic cavity and a plurality of auxiliary sealing cavities located on both sides of the main aerostatic cavity.

Fig. 7 illustrates still another version of the bearing in which member 700 may be either a stator or a rotor, which is also true of a member 701. It will be assumed here that member 701 is a stator and member 700 is a rotor. Stator 701 is mounted in a frame member 702 which is provided with a duct 703 leading into the cavity 704 which is a ring-shaped cavity extending throughout the 360° of stator 701. The same considerations apply to the angular dimension of cavity 704 as those applying to cavity 45. Compressed fluid leaving duct 703, as illustrated by an arrow 705 enters the circular duct 704 and then enters a plurality of ducts 706 in the manner indicated by arrows 707 and 708. Duct 706 opens into the central cavity 709 which is provided with the wall members 710 and 711 which correspond to the wall members 88 and 89 in Figs. 1 and 2. The wall members 710 and 711, therefore, extend throughout the 360° of stator 701, which is also true of the wall members 712, 713, 714 and 715.

The fluid entering main cavity 709 exerts a static pressure on a flat surface 716 of rotor 700 which may form some convenient angle, such as 45°, with the axis of rotation of the bearing. This angle need not be a 45° angle, but may be either larger or smaller, an angle of 45°, being a convenient angle for use in the shaft bearings as well as thrust bearings. This angle may vary quite widly, such as from, for instance, 30° to 60°. The opposed and adjacent surfaces on the stator and rotor form air gaps, such as gaps 718 and 719. These air gaps correspond to the air gaps 90 and 91 in Fig. 1. Wall members 710, 736 and 711, 737 form two vortex cavities 720 and 721 in which fluid forms two respective vortexes 722 and 723 illustrated by arrows 722 and 723. These cavities are followed, in the downstream direction, by the cavities 725 and 726, and then by the cavities 727, 728, 729 and 730, all of which produce vortexes of their own, illustrated by the respective arrows within the cavities. Cavity 728 is adjacent to a labyrinth gap 731 and cavity 730 is adjacent to a labyrinth cavity 732, which finally lead the working fluid into some suitable plenum chamber or ambient air, as illustrated by arrows 733 and 734. Rotor 700 is provided with the extensions 735, 736, 737 and 738 which are used for separating the respective cavities formed between the stator and the rotor into two cavities. Accordingly, these extensions act as cavity partitions for increasing the number of the toroidal cavities within the bearing.

The function of this bearing is identical to that illustrated in the prior figures and, therefore, does not require any length description. Suffice it to say that fluid is conveyed into the central chamber 709 at relatively high pressure, and this high pressure is gradually reduced through a plurality of cavities which are located on both sides of the central cavity 709. Each auxiliary cavity 720 through 729 has the approximate shape of a toroid, with the result that the escaping fluid forms a vortex in each toroidal cavity and these vortexes act as fluid seals which impede the escape of the fluid into ambient air through the bearing. A further modification of Fig. 7 is illustrated in Fig. 10, which also has a plurality of cavities on each side of the central cavity.

Fig. 8 illustrates the application of the type of bearing illustrated in Fig. 6 to the shaft 800, which may be either a horizontal or a vertical shaft. The shaft is provided with a shoulder 801 and rotor 802 of the bearing. Stator 803 is provided with compressed air through a duct 804 in the same manner as in Fig. 6. When the bearing illustrated in Fig. 8 must act as a thrust bearing, the number of auxiliary cavities, such as cavities 805 and 806, should, preferably, be increased in order to provide sufficient static pressure for supporting the entire load and the thrust by means of the pressure exerted by the fluid on rotor 802. It is understood that shaft 800 will require two bearings for supporting it at both ends in the manner shown in Figs. 4 and 5.

Fig. 9 illustrates an additional version of the aerostatic bearing in which the static pressure of the fluid exerted on a shaft 900 does not produce any side thrust. This bearing is suitable for use as a horizontal bearing (Fig. 4) or as a vertical bearing 504. It is not suitable as a thrust bearing 502. Shaft 900 is provided with an enlarged portion, or ring, 901 keyed to shaft 900. Ring 901 is provided with a precision-ground surface 902 which normally forms a small gap between the walls 903, 904, 905 and 906 and the ground surface of the ring 901. The stator 907 of the bearing is provided with a central cavity 908 and two auxiliary cavities 909 and 910 where working fluid, escaping from the central cavity 908, forms vortexes illustrated by the arrows. These vortexes act as fluid-dynamic seals with respect to the gaps 912 and 913 which exist between ring 901 and stator 907 of the bearing. The dotted lines 914, 915, 916 and 917 illustrate the angular boundaries of the central cavities, such as cavity 908. These cavities are distributed around the periphery of ring 901 in such a manner as to furnish proper aerostatic support to shaft 900. The distribution of these cavities may be identical to that illustrated in Fig. 3.

The function of the bearing illustrated in Fig. 9 is identical to the function of bearings shown in Figs. 1 through 8 and, therefore, needs no detailed description. Shaft 900 is supported by means of the aerostatic pressure of fluid and the escaping impedance between the main or central cavity 908 and ambient air is made high with the aid of the walls 905 and 906, toroidal cavities 909 and 910 and gaps 912 and 913, which are aerodynamically sealed with the aid of the vortexes created in the toroidal cavities.

Fig. 10 illustrates a further modification of Fig. 9. In Fig. 10, there are three cavities 1001, 1002 and 1003 to the right of the central cavity 1000, and three cavities 1004, 1005 and 1006 to the left of cavity 1000. Accordingly, the impedance, or resistance, between cavity 1000 and ambient air is higher in Fig. 10 in proportion to the number of cavities used in the bearing. As mentioned previously, the configuration of elements shown in Fig. 10 is also applicable to the type of bearing shown in Fig. 1-A by enlarging the number of the extensions 100 and 101, and also by giving them the shape of the extensions 1010 in Fig. 10.

The disclosed bearings are described here as aerostatic bearings because the main load-supporting bearing areas, such as the areas offered by the cavities 47, 68 and 71 in Fig. 1, or cavities 1000 through 1006 in Fig. 10, act as straight-forward aerostatic areas. The bearings also have aerodynamically acting areas, which are the areas equal to the areas of the gaps, such as gaps 90, 91, 31 and 32 in Fig. 1 and identical ten unnumbered gaps in Fig. 10. These gaps behave like aerodynamic bearings and, therefore, strictly speaking, the bearings are aerostatic-aerodynamic bearings. The load-carrying capacity of the aerodynamic portion of the bearing, however, is not significant and, for the type of description given here, can be neglected, or, at least, dismissed with a mention. These gaps, however, play a very important role by increasing the impedance of the leakage circuit in their own right, and also with the aid of the toroidal cavities and the fluid-dynamic seals created by the cavities. The cavities also act as gradual pressure reducers, with the result that the pressure drop across any individual gap becomes smaller. For example, in Fig. 10, if the normal maximum pressure in cavity 1000 is $p_{max}$, then the pressures in the adjoining cavities 1001 through 1003 are $p_1$, $p_2$ and $p_3$ with $$p_{max} > p_1 > p_2 > p_3 > p_0 \tag{1}$$

where $p_0$ is an ambient pressure. The pressure drop across any aerodynamic gap in this case is substantially one-fourth of the total pressure drop from $p_{max}$ to $p_0$, and, therefore, the leakage flow will be, roughly, four times less than in the case where there is only one aerodynamic gap between the central cavity and $p_0$.

It is assumed in the above discussion that the impedances of all gaps are equal, which is not the case insofar as the very last labyrinth gaps 1020 and 1021 are concerned—they have a higher impedance. As to the impedances of the remaining gaps, they can be made equal to each other, in which case the relationships between the pressures in the adjoining gaps can be expressed with a reasonable degree of accuracy by the equation:

$$p_2 = \tfrac{1}{2} p_{max} \tag{2}$$

The disclosed bearings, therefore, will have a higher fluid-dynamic leakage impedance (borrowing the terminology from the electrical networks), lower leakage current, and higher load carrying capacity than the bearings of the prior art, whose leakage impedance is lower.

Carrying the electrical analogy still further, the total impedance of each branch of the leakage circuit in Fig. 10 is $$Z_b = Z_1 + Z_2 + Z_3 + Z_4 \tag{3}$$

where $Z_1$, $Z_2$, etc., are the impedances of the respective airgap-toroidal cavity combinations, and $Z_4$ is the impedance of gap 1020. The total impedance of the bearing is then $$Z_t = \frac{Z_b}{2} \tag{4}$$

This high leakage impedance is especially desirable in the large diameter bearings since the individual components $Z_1$, $Z_2$, etc., decrease rapidly because of the increase in the lengths of the gaps with the increase in the diameter of the bearing.

What is claimed as new is:

1. An aerostatic bearing having a rotor and a stator, said stator having a central cavity, a duct opening into said central cavity for supplying working fluid under pressure into said cavity, said central cavity having a continuous side wall normally, when air bearing is in operation, forming a gap with the rotor of said bearing and at least one auxiliary cavity on each side of said central cavity, the transverse cross-section of said auxiliary cavity approximating, or approaching, a circle whereby fluid escaping from said central cavity into said auxiliary cavity through said gap forms a vortex within said cavity, and a labyrinth seal between said rotor and said stator on the downstream side of said auxiliary cavity, said labyrinth seal having a gap opening into said auxiliary cavity, said gap being fluid-dynamically sealed by the flow of said fluid across said gap with the aid of the vortex formed by said fluid within said auxiliary cavity.

2. The aerostatic bearing as defined in claim 1 in which said stator and said rotor include a plurality of auxiliary toroidal cavities on each side of the central cavity.

3. An aerostatic bearing comprising a ring-shaped stator and a ring-shaped rotor, said stator having a plurality of central cavities circumferentially distributed around the periphery of said stator, each of said central cavities having a duct connected to a source of fluid under pressure, said stator also having at least one auxiliary toroidally-shaped vortex cavity on each side of each central cavity, said vortex cavity having the same arcuate length as the arcuate length of the adjacent central cavity, the transverse cross-section of each auxiliary cavity approximating a circle for creating a vortex flow of the working fluid within said auxiliary cavity, a continuous side wall defining the boundaries of said central cavity, the surface of said side wall adjacent to, or opposed to, the surface of said rotor having a convex spherical surface, the center of the radius of said spherical surface lying along the axis of said rotor, a corresponding spherical concave surface on the rotor, matching the convex spherical surface on the stator, said concave surface normally closing off said central cavity and at least in part closing off said auxiliary cavities, said convex and concave surfaces normally forming a gap between each other through which fluid from said central cavity escapes into said auxiliary cavity through said gap, a labyrinth seal between said rotor and said stator on the downstream side of said auxiliary cavity, one end of said labyrinth seal opening into said auxiliary cavity and the other end of said seal opening into an ambient medium, said labyrinth seal being positioned in said auxiliary vortex cavity so that the vortex flow of such fluid within said vortex cavity forms a fluid-dynamic seal with respect to said labyrinth seal.

4. The aerostatic bearing as defined in claim 3 which includes a plurality of auxiliary vortex cavities serially positioned between the central cavity and the ambient medium, said cavities being fluid-dynamically connected in series with each other between said central cavity and said ambient medium, said labyrinth seal opening into the very last auxiliary cavity which is adjacent to said ambient medium.

5. An aerostatic bearing comprising a rotor and a stator, said rotor and stator having opposed surfaces defining a plurality of central cavities circumferentially distributed around the opposed circumference of said stator and said rotor, and a plurality of auxiliary cavities on each side of said central cavity, the cross-section of each auxiliary cavity approximating a circle, the last auxiliary cavity being adjacent to an ambient medium and including a labyrinth seal formed by the opposed surfaces of said rotor and stator on the down-stream side of said last auxiliary cavity, all of said auxiliary cavities having a vortex flow of the fluid through said auxiliary cavities for obtaining a dynamic fluid seal between the preceding cavity and the succeeding cavity for increasing the impedance, or resistance, to the flow of a working fluid from the central cavity to the ambient medium.

6. An aerostatic bearing comprising a stator and a rotor, a central cavity normally having a working fluid under pressure within said central cavity for supplying a portion of aerostatic lift of said bearing, a plurality of auxiliary cavities on each side of said central cavity, each set of said auxiliary cavities comprising a fluid-dynamic series circuit between said central cavity and an ambient medium surrounding said bearing, the cross-section of each auxiliary cavity approximating a circle, a fluid-dynamic gap between the central cavity and each adjacent auxiliary cavity; a fluid-dynamic gap between adjacent auxiliary cavities; and wall members on said rotor and said stator for—at least in part—forming all of said cavities; the opposed portions of the surfaces of said rotor and stator and of said wall members defining the boundaries of the respective fluid-dynamic gaps.

7. The aerostatic bearing as defined in claim 6 in which the fluid-dynamic gaps in said auxiliary cavities are positioned along the circumference of the respective cavity so that a vortex flow of the working fluid within the auxiliary cavity is substantially in the opposite direction to the direction of escape of said fluid from said auxiliary cavity.

References Cited in the file of this patent

UNITED STATES PATENTS

| | | |
|---|---|---|
| 1,906,715 | Penick | May 2, 1933 |

FOREIGN PATENTS

| | | |
|---|---|---|
| 1,088,917 | France | Sept. 22, 1954 |
| 767,656 | Great Britain | Feb. 6, 1957 |
| 1,155,958 | France | Dec. 9, 1957 |